United States Patent [19]
Meyer

[11] Patent Number: 5,207,246
[45] Date of Patent: May 4, 1993

[54] FLUID VALVE, IN PARTICULAR AN AIR PRESSURE VALVE

[75] Inventor: Ernst-August Meyer, Wennigsen, Fed. Rep. of Germany

[73] Assignee: Mannesmann Aktiengesellschaft, Düsseldorf, Fed. Rep. of Germany

[21] Appl. No.: 808,653

[22] Filed: Dec. 17, 1991

[30] Foreign Application Priority Data

Dec. 17, 1990 [DE] Fed. Rep. of Germany ....... 4040797

[51] Int. Cl.⁵ ............................................. F16K 11/06
[52] U.S. Cl. ........................... 137/625.65; 137/625.23; 137/625.24
[58] Field of Search ...................... 137/625.24, 625.21, 137/625.23, 625.46, 625.65, 625.66

[56] References Cited

U.S. PATENT DOCUMENTS

| | | | |
|---|---|---|---|
| 2,621,886 | 12/1952 | Mueller | 251/900 X |
| 2,631,002 | 3/1953 | Mueller | 251/900 X |
| 2,988,107 | 6/1961 | Rudelick | 137/876 X |
| 3,058,816 | 10/1962 | Rudelick | 137/625.46 X |
| 3,090,396 | 5/1963 | Rudelick | 251/367 X |
| 3,146,795 | 9/1964 | Retallick | 137/625.23 X |
| 3,471,021 | 10/1969 | Prizler | 137/625.46 X |
| 4,506,697 | 3/1985 | Marchant | 137/625.46 X |

FOREIGN PATENT DOCUMENTS

2326749 12/1974 Fed. Rep. of Germany.
2633443 1/1978 Fed. Rep. of Germany.

*Primary Examiner*—Alan Cohan
*Attorney, Agent, or Firm*—Horst M. Kasper

[57] ABSTRACT

A valve for fluids exhibits a valve casing (1) with a sealed valve element (2) movable into various switching positions, as well as connections (3) through (6) for operating lines, pressure lines, vent lines, and the like. The valve is furnished with sealing rings (7) forming a valve seat (19) in the individual switching position in each case together with the peripheral faces of the valve casing (1). The valve is of a simplest construction for a large number of switching positions and for different numbers of switching positions with short switching times and with a smallest possible number of parts. At least one sealing ring (7) is coordinated to the rotary-driven valve element (2). The sealing ring (7) is in each case disposed in a plane (9), running at an angle relative to the rotation axis (8). A disk (11) or an axial body are disposed in the same plane (9) defined by the sealing ring. The disk (11) or axial body form the valve seat (19) in each case together with a spatially fixed sealing ring (7), or the respective disk (11) or, respectively, the axial body and at least one corresponding sealing ring (7) form the valve seat (19) together with the valve casing bore (1a) in different rotary positions of the valve element.

23 Claims, 6 Drawing Sheets

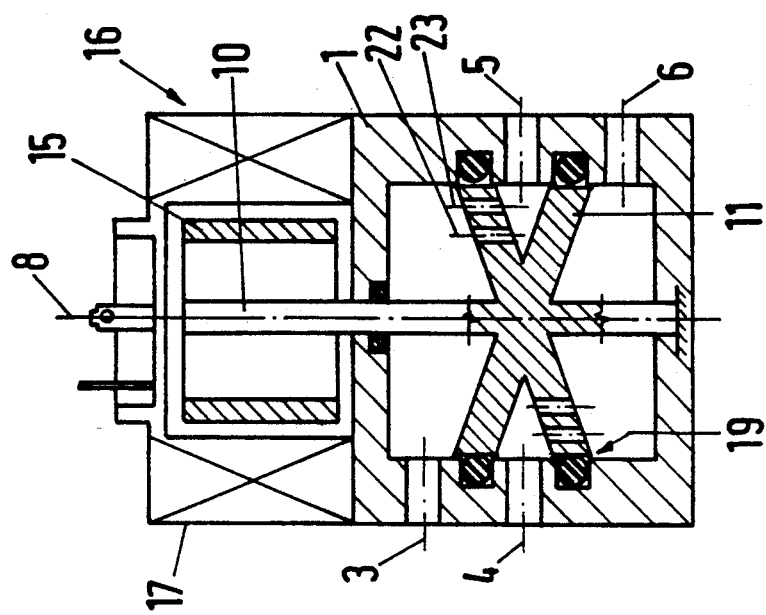
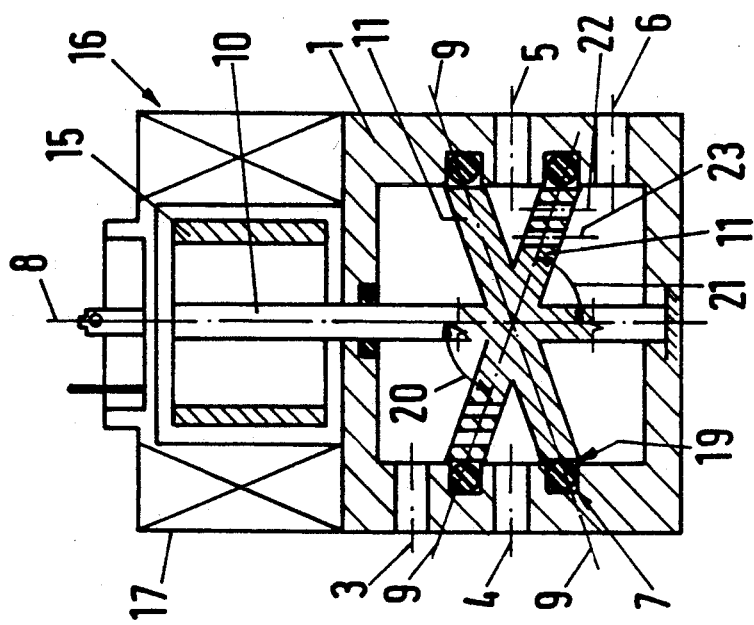

5,207,246

FLUID VALVE, IN PARTICULAR AN AIR PRESSURE VALVE

BACKGROUND OF THE INVENTION

1. Field of the Invention

The invention relates to a valve for fluids in particular a compressed air valve, with a single-part or a multi-part valve casing and with a sealed valve element, disposed in the valve casing and movable into several switching positions, with connection ports furnished at the valve casing for operating lines, pressure lines, ventilation lines, and with sealing rings forming a valve seat in the individual switching positions in each case together with the peripheral faces of the valve casing.

2. Brief Description of the Background of the Invention Including Prior Art

Such valves, formed as directional valves, are employed in hydraulic and pneumatic applications. The use of such valves is determined in many cases dependent on the driving times of the cylinder movement of the valve nominal width and on the load.

The specific properties of this kind of valve lead frequently, in particular in connection with mechanically sealed rotary sliders, to problems of the sealing capacity and, in case of longitudinal slider valves with lifting magnets, to a high friction and insufficient switching times. In addition, such valves comprise an economically unjustifiably large number of parts, where in particular the number of the sealing rings is of substantial importance.

SUMMARY OF THE INVENTION

1. Purposes of the Invention

It is an object of the present invention to provide a valve of the initially recited kind based on a simplest construction for allowing a large number of switching positions, for different numbers of switching paths, with short switching times and with a lowest possible number of parts.

These and other objects and advantages of the present invention will become evident from the description which follows.

2. Brief Description of the Invention

According to the present invention, there is provided for a valve for fluids. A valve casing has a valve casing bore. A plurality of connection ports are furnished at the valve casing for providing connections of the valve casing bore to operational lines, pressure lines, vent lines. A rotary drive has a rotation axis. A first disk is supported in the valve casing, connected to the rotary drive, disposed in a first plane located at a first angle relative to the rotation axis, and movable into a first plurality of switching positions. A first sealing ring is coordinated to the first disk. The first disk and the first sealing ring can be positioned to be disposed in a first single plane. The first disk and the first sealing ring together with the valve casing bore form a first valve seat in a first predetermined rotary position of the rotary drive.

A second disk can be supported in the valve casing, connected to the rotary drive, disposed in a second plane located at a second angle relative to the rotation axis, and moved into a second plurality of switching positions. A second sealing ring can be coordinated to the second disk. The second disk and the second sealing ring can be positioned to be disposed in a second single plane. The second disk and the second sealing ring together with the valve casing bore can form a second valve seat in a second predetermined rotary position of the rotary drive. The first sealing ring can form a first valve seat in individual switching positions of the first disk together with peripheral faces of the valve casing.

The first sealing ring and the second sealing ring can be disposed as two intersecting ellipses having a minor axis of equal size and forming two crossing points of the first sealing ring and of the second sealing ring. A first groove can be disposed in the valve casing bore and can be adapted to fixedly hold the first sealing ring. A second groove can be disposed in the valve casing bore and can be adapted to fixedly hold the second sealing ring. The first groove and the second groove can intersect each other at two points disposed in a single plane perpendicular to the rotation axis.

The first and the second groove can be disposed such that the first groove and the second groove do not intersect each other. The first sealing ring can be disposed as a first ellipse and the second sealing ring can be disposed as a second ellipse. The first ellipse and the second ellipse can have a minor axis of equal size and do not intersect.

A rotary shaft can connect the rotary drive to the first disk and to the second disk. The first disk and the second disk can be disposed sequentially on the rotary-driven shaft when viewed in a direction of the rotation axis. The value of the first angle can differ from the value of the second angle by at least about 5 angular degrees. The grooves can be disposed in the valve casing bore and disposed radially toward each other at different angles.

The rotary shaft can be incorporated in a central rotary position in the valve casing. One end of the rotary shaft can be disposed with a stationary axis in a casing floor. The first disk, disposed at a first angle relative to the rotation axis, can be fixed against rotation on the shaft. The rotary drive can include a rotor. A second end of the rotary shaft can be connected to the rotor of the rotary drive.

The rotary drive can include an electric motor with a stator. The stator of the rotary drive can be attached to the valve casing as a stator casing.

A plastic casing can encapsulate the stator of the rotary drive. A standard plug can be furnished at the plastic casing for providing an electrical connection of the electric motor.

The rotary drive can be furnished by a manual drive or by a pneumatic drive.

The first sealing ring can be provided with an oval cross-section.

The first disk can be furnished with a passage opening, running in the peripheral region of the first disk. An axis of the passage opening can be disposed parallel relative to the rotation axis.

The present invention provides that at least one packing ring or sealing ring is coordinated to the rotary driven valve element. The sealing ring is disposed in a plane intersecting the rotation axis at an inclined angle. A disk or an axial body are disposed in the same plane disposed at an inclined angle. The disk or the axial body, in each case together with one spatially fixed sealing ring, or the respective disk or, respectively, the axial body and at least one corresponding sealing ring together with the valve casing bore form the valve seat in different rotary positions of the valve element. A simple construction is hereby provided even though several switching positions are possible and the number of switching positions can be easily changed. In addition, short switching times can be employed and the number of parts is small.

Several switching positions can be created in the case of such valves such that one sealing ring is formed by two sealing rings penetrating each other in cross shape in case of two rotary positions of the disk dependent on the rotation angle of the disk and dependent on the distance of the two valve seats. The cross-shaped sealing rings are fixedly embedded in the cross grooves furnished axially spaced apart in the valve casing bore. Despite the number of paths, essentially only two parts and only one single seal are required. In case of a small number of parts, the number of possible switching positions or, respectively, paths can however be increased by disposing two or more disks on a rotary-driven shaft sequentially behind each other in a direction of the rotation axis.

The disposition of the paths or, respectively, the connectors can also be influenced in that the sequentially disposed disks, are arranged on the shaft at different angles relative to the rotation axis or in that the disks or, respectively, the grooves of the axial body are placed radially at different angles relative to each other.

The construction of the valve is equal and the same in all these cases and is formed such that a valve casing is furnished with a central, hingedly supported shaft where a first end of the shaft is disposed axially stationary in a casing floor, that at least one disk, disposed at an angle relative to the rotation axis, is disposed fixed against rotation on the shaft, and that a second end of the shaft is connected to a rotor of rotary motor.

It is advantageous in this context that the rotary drive comprises an electromotor, where the stator of the electromotor adjoins and is attached as a stator casing to the valve casing, or that the rotary drive comprises a manual or, respectively a pneumatic drive.

The occurring friction or, respectively, the unavoidable wear is counteracted and inhibited by furnishing the sealing ring or, respectively, the sealing rings with an oval or elliptical cross-section.

Advantageously, the sealing rings can be supported such that one or several of the disks are furnished with one or several recesses, running in the peripheral region and with their axes parallel to the rotation axis.

Finally, it is further advantageous that the stator of the rotary drive is surrounded by a plastic casing and that a standard plug or standard socket is furnished at the plastic casing for the electrical connection of the electromotor.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 2 is a cross-sectional view according to the section line A—A of FIG. 1a;

FIG. 3a is an axial cross-sectional view through a valve according to a second embodiment;

FIG. 3b shows an axial cross-sectional view through the same valve illustrated in FIG. 3a in a different switching position;

DESCRIPTION OF INVENTION AND PREFERRED EMBODIMENT

Figure 1A:
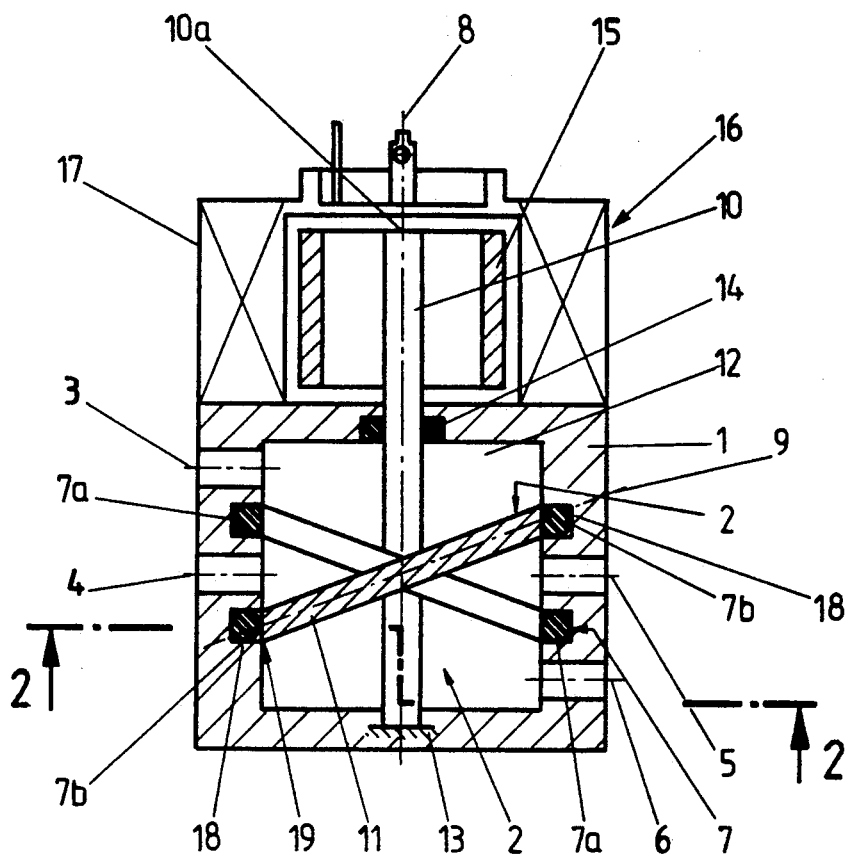
FIG. 1a is an axial cross-sectional view through a valve according to a first embodiment.
Figure 2:
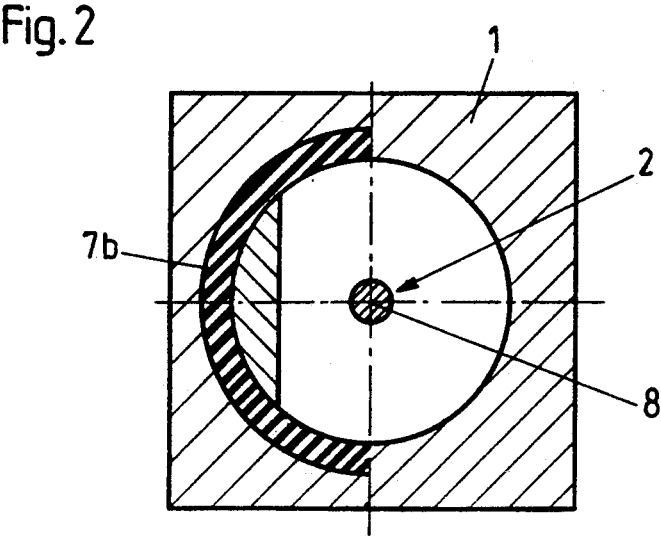

According to the present invention, there is provided for a valve for fluids, in particular a compressed air valve, with a single-piece or multi-piece valve casing. A sealing valve element is supported in the valve casing and can be moved into various switching positions. Connections are furnished at the valve casing for work lines, pressure lines, vent lines, and the like. Sealing rings form a valve seat in the individual switching positions in each case together with peripheral faces of the valve casing. At least one sealing ring 7 is coordinated to the rotary-driven valve element 2. The sealing ring 7 is in each case disposed in a plane 9 running at an angle relative to the rotation axis 8. A disk 11 or an axial body is disposed in the same plane 9. The valve seat 19 is formed in different rotary positions by the disk 11 or the axial body in each case together with one spatially fixed sealing ring 7 or by the respective disk 11 or, respectively, the axial body, and at least one corresponding sealing ring 7 together with the valve casing bore 12.

One sealing ring 7 can be formed, in case of two rotary positions of the disk 11, dependent on the rotation angle of the disk 11 and dependent on the distance of the two valve seats 19, by two cross-shaped sealing rings 7a, 7b, penetrating each other like a cross. The cross-shaped sealing rings 7a, 7b can be fixedly embedded in cross grooves 18, disposed axially spaced apart in the valve casing bore 1a.

Two or more disks 11 can be disposed sequentially on a rotary-driven shaft 10 in direction of the rotation axis 8. The sequentially disposed disks 11 can be disposed on the shaft 10 at different angles to the rotation axis 8, or the disks 11, or respectively, the grooves 24 of the axial body are disposed radially toward each other at different angles.

Figure 7A:
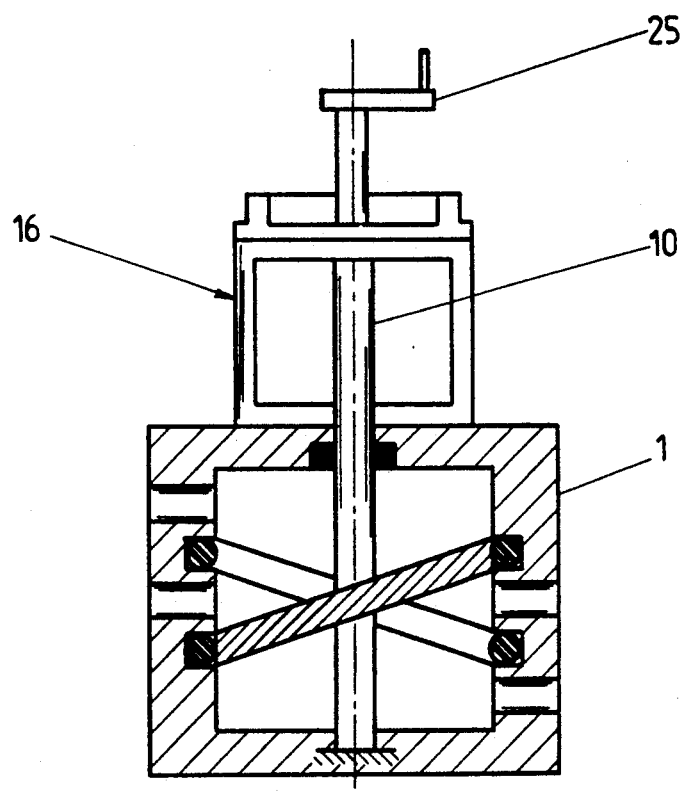
FIG. 7a is an axial cross-sectional view of the rotary drive furnished as a manual drive.
Figure 7B:
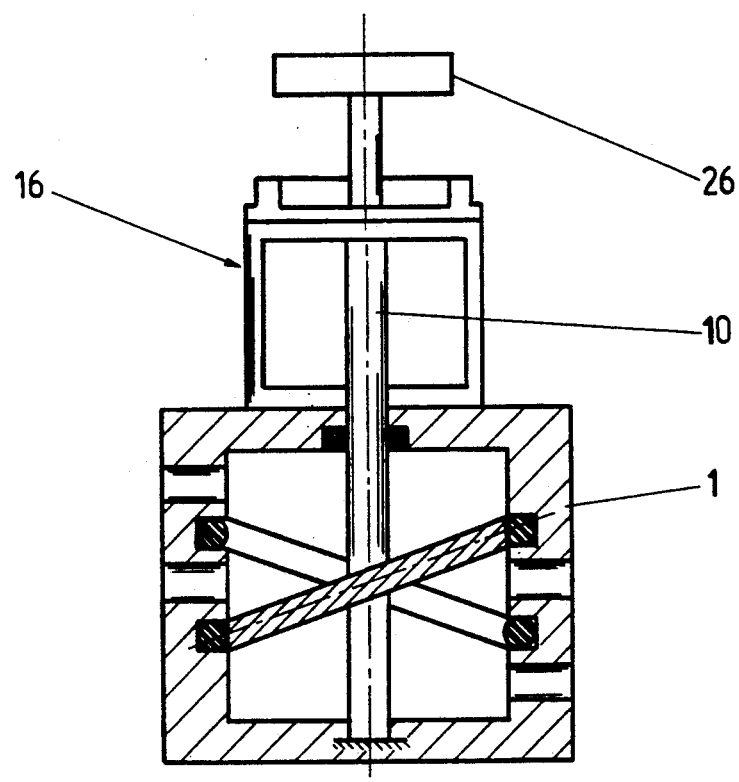
FIG. 7b is an axial cross-sectional view of the rotary drive furnished as a pneumatic drive.

A valve casing 1 can incorporate the shaft 10 in a central rotary position. One end of the shaft 10 can be disposed axially stationary in a casing floor. At least one disk 11, disposed at an angle to the rotation axis 8, can be fixed against rotation on the shaft 10. The other shaft end 10a can be connected to a rotor 15 of a rotary drive 16. The rotary drive 16 can be furnished by a member selected from the group consisting of a manual drive 25 (FIG. 7a), a pneumatic drive 26 (FIG. 7b) and an electric motor. The stator 28 of the electric motor can be attached to the valve casing 1 as a stator casing 17.

The sealing ring can be provided with an oval cross-section.

The disk 11 can be furnished with a passage opening 23, located in the peripheral region of the disk 11 and with the axis 22 of the passage opening disposed parallel relative to the rotation axis 8.

The stator 28 of the electric motor can be encapsulated with a plastic casing 29. A standard plug 30 can be furnished at the plastic casing 29 for providing an electrical connection of the electric motor.

The compressed air valve includes according to a first embodiment illustrated in FIG. 1a a single-piece valve casing 1 with a valve element 2 for providing the different switching positions. Port connections 3, 4, 5, and 6 are furnished for operational lines, pressure lines, vent lines and the like. Sealing rings 7 are coordinated in a special way to the valve element 2, as will be described in the following.

A sealing ring 7a and a sealing ring 7b are coordinated to the rotary driven valve element 2, where the sealing ring 7a and the sealing ring 7b form a single-piece sealing ring 7. Each of the sealing rings 7a and 7b is disposed in a plane 9, running at the angle relative to the rotation axis a. A disk 11, attached to a shaft 10, is disposed in the plane 9. An axial body can also be furnished instead of the disk 11 and of the shaft 10. The axial body substantially fills the valve space 12 and is rotatably supported and rotary driven by way of an axial bearing 13 as well as sealed by way of the seal 14.

The drive comprises a rotor 15 of a rotary drive 16, attached at one shaft end 10a of the shaft 10. The rotary drive 16 is sealingly connected with its stator casing 17 to the valve casing 1.

Figure 1B:
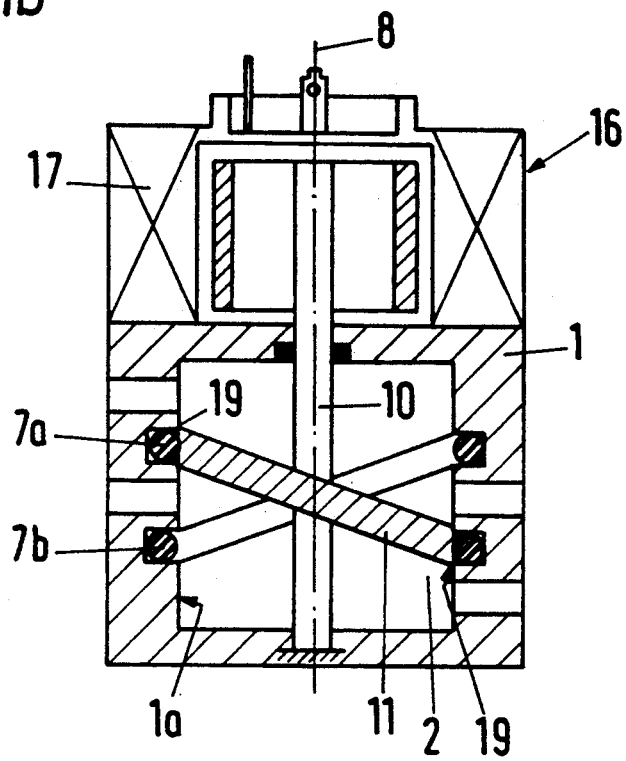
FIG. 1b is a similar cross-sectional view of the same embodiment as that of FIG. 1 in a different switching position of the valve element.

FIG. 1b shows that after a rotation of the shaft 10 by 180 degrees, there has been reached another switching position of the valve.

The sealing rings 7a and 7b are in this case placed and inserted spatially fixed into cross grooves 18. The disk 11 and, in each case, the sealing rings 7a and 7b or, respectively, the axial body, form together with the valve casing bore 1a the valve seat 19.

According to a second embodiment, illustrated in FIGS. 3a and 3b, two disks 11 are disposed crossing each other on the shaft 20 or, i.e., in each case angles 20 or, respectively, 21 are furnished between a plane of a respective disk 11 and the rotation axis 8. One or two disks 11 are furnished with several recesses or passage openings 23, running in the peripheral region of the disk and with the axis 22 of the passage opening 23 parallel to the rotation axis 8. Since the disks 11 support the respective sealing ring 7, there results thereby the possibility of guiding the flow. FIG. 3b shows a rotary position, rotated by 180 degrees, of the valve element 2 relative to the position shown in FIG. 3a.

Figure 5:
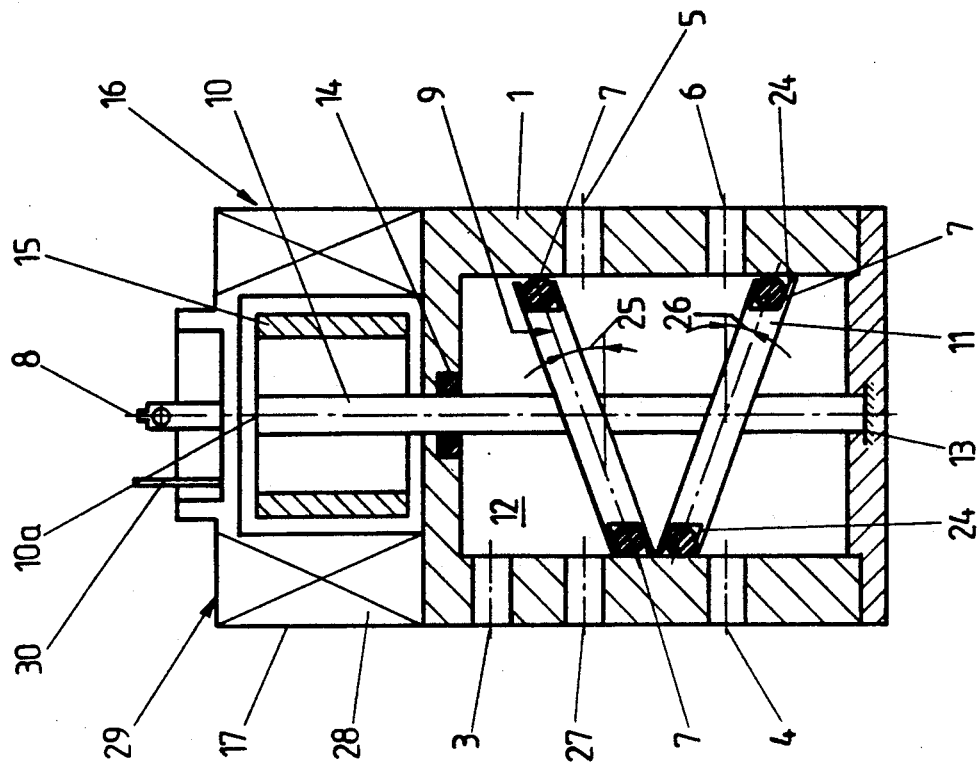
FIG. 5 is an axial cross-sectional view of the valve according to the fourth embodiment.
Figure 4:
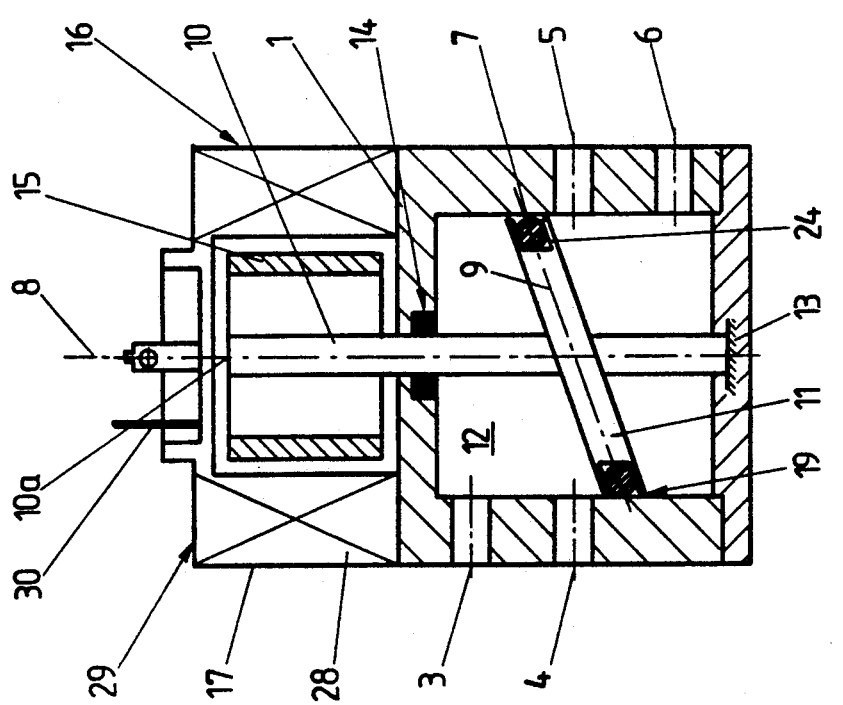
FIG. 4 is an axial cross-sectional view of the valve according to a third embodiment.

A third and a fourth embodiment are illustrated in FIGS. 4 and 5. The third embodiment illustrated in FIG. 4 shows one single disk 11 with one single sealing ring 7, which sealing ring 7 is resting according to FIG. 4 embedded in a groove 24. Thus, in this case, the sealing ring 7 is movable together with the disk 11.

The fourth embodiment is illustrated in FIG. 5. According to the fourth embodiment, two disks 11 are disposed at different angles 25 and 26 on the shaft 10, as measured between a plane of the respective disk and a plane perpendicular to the shaft axis. The two disks 11 in each case hold the sealing ring 7 in grooves 24. Upon rotation of the shaft 10, a further connection 27 can be switched here.

The complete device unit is sealingly closed. The stator 28 of the rotary drive 16 is disposed in the stator casing 17 and the stator casing 17 is encapsulated in a plastic casing 29. Only one standard plug 30 or one standard socket protrudes at the plastic casing 29 for providing an electrical connection of the rotary drive 16.

Figure 6A:
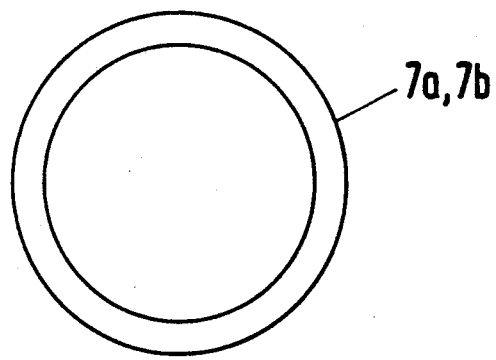
FIG. 6a is a view of a single-piece sealing ring in a front elevation view.
Figure 6B:
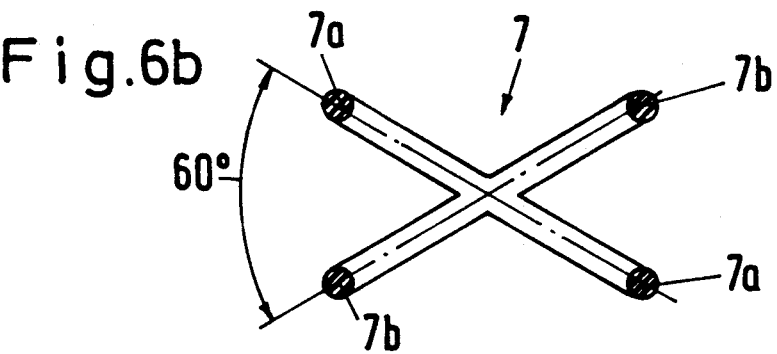
FIG. 6b is a cross-sectional view of a single-piece sealing ring.

In addition, the single-piece sealing ring 7, comprising the sealing rings 7a and 7b, is illustrated separately in FIGS. 6a and 6b. It can be recognized from FIG. 6a that the front view of the sealing ring 7 is circular even though, in the case of FIG. 6a, two cross-shaped running sealing rings 7a and 7b are illustrated. The shape of the sealing ring as employed is elliptical with the length of the minor axis of the ellipse equal to the inner diameter of the valve space 12 and with the length of the major axis of the ellipse being the diameter of the valve space divided by the trigonometric sin of the angle between the plane of the ellipse and the rotation axis. In order to be able to switch the port connections on and off, such port connections are preferably disposed at a level of the valve space corresponding to a level of the center of a respective sealing ring or sealing ellipse 7. In addition, port connections can be provided at the upper end or at the lower end of the valve space. The valve space 12 is separated from a magnet rotor attached to the valve axis by a seal 14 and a separation wall. No port connections are provided in the separation wall. A stator coil is preferably placed in the stator casing for actuating the magnet rotor and the valve. The outer diameter of the stator is substantially equal to the outer diameter of a casing surrounding the valve space 12.

It will be understood that each of the elements described above, or two or more together, may also find a useful application in other types of fluid valves differing from the types described above.

While the invention has been illustrated and described as embodied in the context of a fluid valve, and in particular, an air pressure valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A valve for fluids comprising
   a valve casing having a valve casing bore;
   a plurality of connection ports furnished at the valve casing for providing connections of the valve casing bore to operational lines, pressure lines, vent lines;
   a rotary drive having a rotation axis;
   a first disk supported in the valve casing, connected to the rotary drive, disposed in a first disk plane located at a first angle relative to the rotation axis, and movable into a first plurality of switching positions;
   a cross-shaped sealing ring formed by a first sealing ring and by a second sealing ring, penetrating each other like a cross, and wherein the cross-shaped sealing ring is fixedly embedded in a cross groove formed by two grooves intersecting each other like a cross and disposed in the valve casing bore and providing two seats to the first disk, wherein the first disk is positionable to be disposed in two respective single sealing planes each associated with one of the two sealing rings, and wherein the first disk and the two sealing rings together with the valve casing bore form two respective valve seats in two respective predetermined rotary positions of the rotary drive.

2. The valve according to claim 1 further comprising a second disk supported in the valve casing, connected to the rotary drive, disposed in a second disk plane located at a second angle relative to the rotation axis, and movable into a second plurality of switching positions.

3. The valve according to claim 2 wherein the second sealing ring is coordinated to the second disk, wherein the second disk and the second sealing ring are positionable to be disposed in the second single sealing plane, wherein the second disk and the second sealing ring together with the valve casing bore form a second valve seat.

4. The valve according to claim 3, wherein the first sealing ring and the second sealing ring are disposed as two intersecting ellipses having a minor axis of equal size and forming two crossing points of the first sealing ring and of the second sealing ring;
a first one of the two grooves is disposed in the valve casing bore and adapted to fixedly hold the first one of the two sealing rings;
a second one of the two grooves is disposed in the valve casing bore and adapted to fixedly hold the second sealing ring, wherein the first groove and the second groove intersect each other at two points disposed in a single plane perpendicular to the rotation axis.

5. The valve according to claim 2 further comprising a rotary shaft connecting the rotary drive to the first disk and to the second disk, wherein the first disk and the second disk are disposed on the rotary-driven shaft at angles of equal absolute value but of opposite sign relative to the rotary shaft, when viewed in a direction of the rotation axis.

6. The valve according to claim 5 wherein
a first one of the two grooves is disposed in the valve casing bore and adapted to fixedly hold the first sealing ring;
a second one of the two grooves is disposed in the valve casing bore and adapted to fixedly hold the second sealing ring, wherein the first groove and the second groove intersect each other,
wherein the first disk is furnished with several passage openings.

7. The valve according to claim 1 further comprising a rotary shaft, wherein the rotary shaft is incorporated in a central rotary position in the valve casing, wherein one end of the rotary shaft is disposed with a stationary axis in a casing floor, wherein the first disk, disposed at a first angle relative to the rotation axis, is fixed against rotation on the shaft, wherein the rotary drive includes a rotor, and wherein a second end of the rotary shaft is connected to the rotor of the rotary drive.

8. The valve according to claim 7, wherein the rotary drive includes an electric motor with a stator, wherein the stator of the rotary drive is attached to the valve casing as a stator casing.

9. The valve according to claim 8 further comprising a plastic casing encapsulating the stator of the rotary drive;
a standard plug furnished at the plastic casing for providing an electrical connection of the electric motor.

10. The valve according to claim 7, wherein the rotary drive is furnished by a manual drive.

11. The valve according to claim 7, wherein the rotary drive is furnished by a pneumatic drive.

12. The valve according to claim 1, wherein the first sealing ring is provided with an oval cross-section.

13. The valve according to claim 1, wherein the first disk is furnished with a passage opening, running in the peripheral region of the first disk, and wherein an axis of the passage opening is disposed parallel relative to the rotation axis.

14. A valve for fluids, in particular a compressed air valve, with a valve casing having a bore, and with a sealing valve element supported in the valve casing and movable into various switching positions, with connections furnished at the valve casing for work lines, pressure lines, vent lines, and the like, a first sealing ring (7a) and a second sealing ring (7b) crossing each other and penetrating each other like a cross and are and are fixedly embedded in cross shaped grooves (18) disposed in the valve casing bore, wherein the first and second sealing rings are disposed at an angle relative to a rotation axis of a rotary-driven valve element (2), the valve element comprising a disk (11) disposable in the same plane as the sealing rings in first and second rotary positions of the disk.

15. The valve according to claim 14, wherein two disks (11) are disposed on a rotary-driven shaft (10) in direction of the rotation axis (8).

16. The valve according to claim 15, wherein the disks (11) are disposed on the shaft (10) at different angles to the rotation axis (8), and wherein the grooves (24) of the axial body are disposed radially toward each other at different angles.

17. The valve according to claim 16, wherein a valve casing (1) incorporates the shaft (10) in a central rotary position, wherein one end of the shaft (10) is disposed axially stationary in a casing floor, wherein one of the disks (11), disposed at an angle to the rotation axis (8), is fixed against rotation on the shaft (10), and wherein the other shaft end (10a) is connected to a rotor (15) of a rotary drive (16).

18. The valve according to claim 17, wherein the rotary drive (16) is furnished by a member selected from the group consisting of a manual drive, a pneumatic drive and an electric motor, wherein the stator (28) of the electric motor is attached to the valve casing (1) as a stator casing (17).

19. The valve according to claim 14, wherein the sealing rings extend along an oval shaped curve.

20. The valve according to claim 14, wherein the disk (11) is furnished with a passage opening (23), located in the peripheral region of the disk (11) and with the axis (22) of the passage opening disposed parallel relative to the rotation axis (8).

21. The valve according to claim 18, wherein the stator (28) of the electric motor is encapsulated with a plastic casing (29), and wherein a standard plug (30) is furnished at the plastic casing (29) for providing an electrical connection of the electric motor.

22. The valve according to claim 14, wherein the valve includes a single-piece valve casing.

23. The valve according to claim 14, wherein the valve includes a multi-piece valve casing.

* * * * *